(12) United States Patent
Vandenberg

(10) Patent No.: US 10,848,017 B2
(45) Date of Patent: Nov. 24, 2020

(54) GENERATORS HAVING ROTORS THAT PROVIDE ALTERNATE MAGNETIC CIRCUITS

(71) Applicant: Chad Ashley Vandenberg, Vancouver, WA (US)

(72) Inventor: Chad Ashley Vandenberg, Vancouver, WA (US)

( * ) Notice: Subject to any disclaimer, the term of this patent is extended or adjusted under 35 U.S.C. 154(b) by 0 days.

(21) Appl. No.: 16/260,649

(22) Filed: Jan. 29, 2019

(65) Prior Publication Data

US 2019/0157918 A1 May 23, 2019

Related U.S. Application Data

(63) Continuation of application No. 15/881,434, filed on Jan. 26, 2018, now Pat. No. 10,193,401, which is a continuation of application No. 15/659,135, filed on Jul. 25, 2017, now Pat. No. 9,882,438.

(51) Int. Cl.
| | |
|---|---|
| *H02K 1/14* | (2006.01) |
| *H02K 1/27* | (2006.01) |
| *H02K 3/18* | (2006.01) |
| *H02K 1/17* | (2006.01) |
| *H02K 1/22* | (2006.01) |
| *H02K 21/04* | (2006.01) |
| *H02K 53/00* | (2006.01) |
| *H02K 21/00* | (2006.01) |

(52) U.S. Cl.
CPC ............. *H02K 1/14* (2013.01); *H02K 1/17* (2013.01); *H02K 1/223* (2013.01); *H02K 1/2753* (2013.01); *H02K 3/18* (2013.01); *H02K 21/00* (2013.01); *H02K 21/042* (2013.01); *H02K 53/00* (2013.01)

(58) Field of Classification Search
CPC .............. H02K 1/17; H02K 1/223; H02K 37/00–37/24; H02K 7/09; H02K 21/04; H02K 21/046; H02K 21/042
USPC ............. 310/181, 90.5, 216.021, 216.022, 310/216.023, 154.02
IPC ................. H02K 1/17,21/04, 21/046, 7/09
See application file for complete search history.

(56) References Cited

U.S. PATENT DOCUMENTS

| | | | |
|---|---|---|---|
| 2,816,240 A | 12/1957 | Zimmerman | |
| 3,219,859 A | 11/1965 | Terry | |
| 4,007,678 A | 2/1977 | Gustavsson et al. | |
| 4,077,678 A * | 3/1978 | Studer | F16C 32/0465 310/153 |
| 5,258,697 A | 11/1993 | Ford | |
| 5,304,882 A | 4/1994 | Lipo | |
| 5,455,473 A | 10/1995 | Lipo | |

(Continued)

FOREIGN PATENT DOCUMENTS

WO          9104603         4/1991

*Primary Examiner* — Thomas Truong
(74) *Attorney, Agent, or Firm* — Fish IP Law, LLP

(57) ABSTRACT

A generator includes a stator that has permanent magnets that complete a magnetic circuit across a series of gaps and through a generator coil. The rotor also includes permanent magnets that complete a magnetic circuit across a gap and through a rotor coil. When the rotor poles align with the stator poles, the stator and rotor magnetic circuits are broken, and new magnetic circuits are completed between the stator and rotor permanent magnets that cross the gap between the stator and rotor poles. A rotor coil can be used to boost the attraction/repulsion between to rotor and stator magnets. Alternating between these magnetic circuits as the prime mover rotates the rotor generates electricity.

10 Claims, 3 Drawing Sheets

(56) References Cited

U.S. PATENT DOCUMENTS

| | | | |
|---|---|---|---|
| 5,825,112 A | 10/1998 | Lipo | |
| 5,825,113 A | 10/1998 | Lipo | |
| 7,683,514 B2 * | 3/2010 | Onuma | F16C 32/0465 310/181 |
| 2008/0272664 A1 | 11/2008 | Flynn | |
| 2009/0121571 A1 * | 5/2009 | Onuma | F16C 32/0465 310/90.5 |
| 2010/0038978 A1 * | 2/2010 | Hoang | C23C 4/04 310/46 |
| 2010/0170741 A1 | 7/2010 | Yamashita | |
| 2011/0070108 A1 * | 3/2011 | Arita | H02K 9/06 417/410.1 |
| 2014/0265693 A1 * | 9/2014 | Gieras | H02P 9/00 310/112 |

* cited by examiner

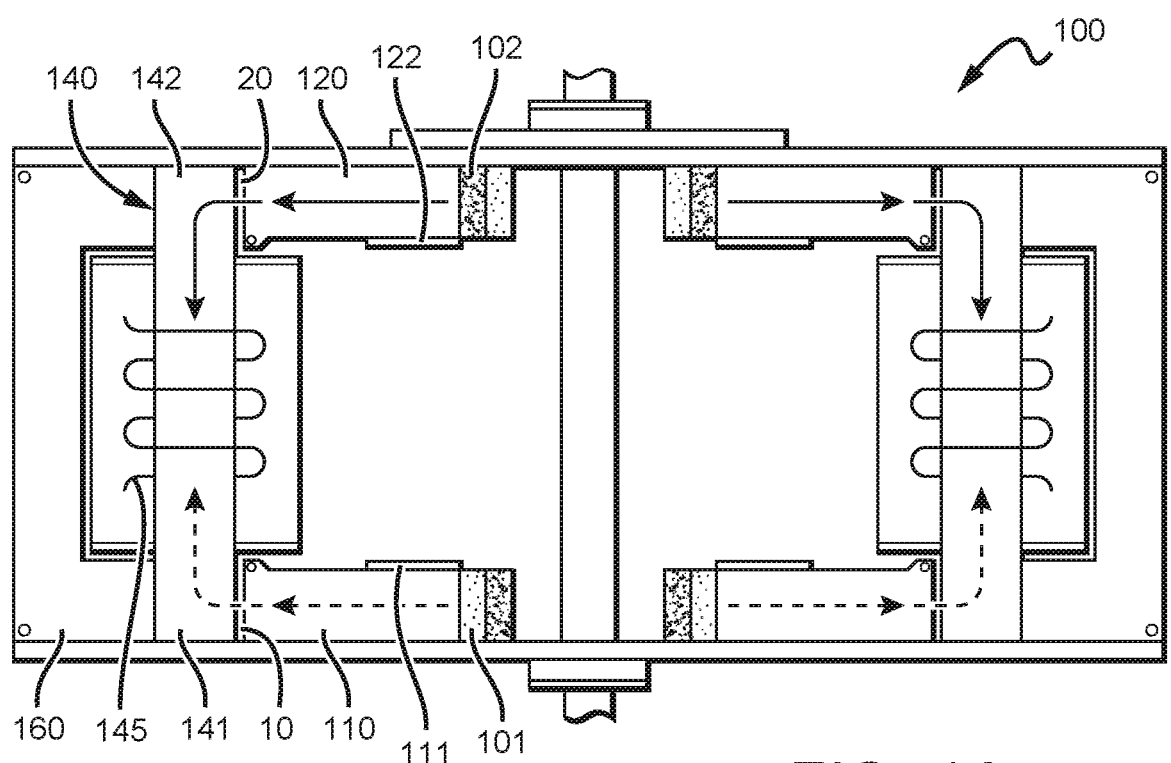
FIG. 1A
FIG. 1B
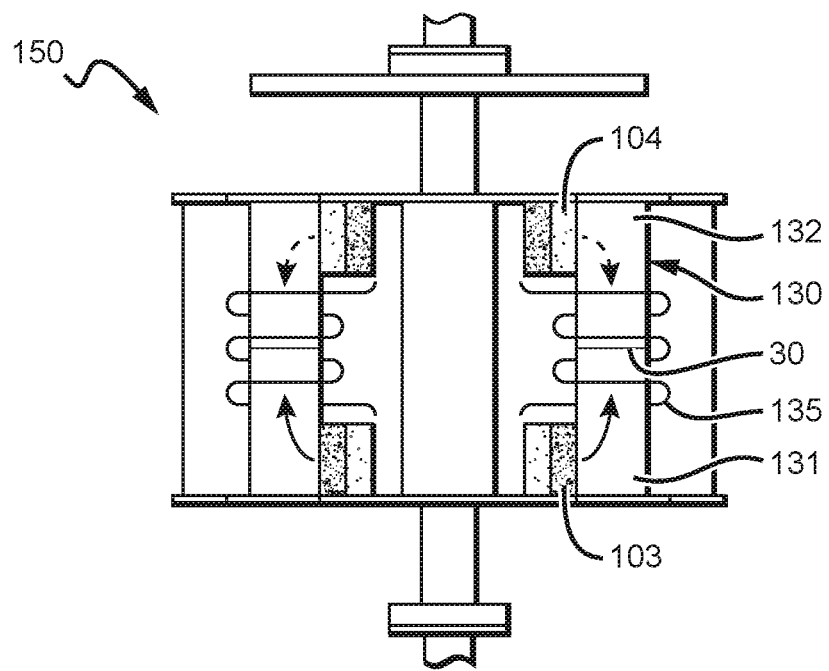

GENERATORS HAVING ROTORS THAT PROVIDE ALTERNATE MAGNETIC CIRCUITS

This application is a continuation of U.S. patent application Ser. No. 15/881,434, filed Jan. 26, 2018, now U.S. Pat. No. 10,193,401 issued Jan. 29, 2019, which is a continuation of U.S. patent application Ser. No. 15/659,135, filed Jul. 25, 2017, now U.S. Pat. No. 9,882,438, issued Jan. 30, 2018. This and all other extrinsic references referenced herein are incorporated by reference in their entirety.

FIELD OF THE INVENTION

The field of the invention is electromagnetic generators that increase efficiency using rotor field coils and rotor magnets to switch between alternate magnetic circuits.

BACKGROUND

The background description includes information that may be useful in understanding the present invention. It is not an admission that any of the information provided herein is prior art or relevant to the presently claimed invention, or that any publication specifically or implicitly referenced is prior art.

Alternating current generators in which the stators utilize permanent magnets to provide the magnetic flux to armature coils suffer numerous disadvantages. Maintaining terminal voltage when an external load is connected to the generator, or when the external load varies, can be technologically challenging. Additionally, much of the magnetic flux from the permanent magnets is unused during operation of traditional generators that utilize magnets.

To address these problems, U.S. Pat. No. 2,816,240 to Zimmerman discloses a generator that includes field coils to maintain terminal voltage. Zimmerman's stator comprises two sets of circular laminations, one of which has two permanent magnets inserted into two angular segments removed from each lamination and oriented such that the like poles face each other. A flux-reversing multi-pole rotor acts as a flux reversing switch for the flux passing though the armature windings when successive teeth of the rotor are in alignment with the successive poles of the stator. When an external load is connected to the generator, excitation of the field coils maintains terminal voltage. However, Zimmerman fails to efficiently use magnetic flux from the stator permanent magnets, because Zimmerman's flux paths travel both through the rotor and around the stator circumference.

In U. S. Patent Application No. 2008/0272664, Flynn discloses electromechanical devices that have increased power density and efficiency. Flynn's electromechanical devices have stators comprised of alternating stator segments and permanent magnets. When Flynn's rotor shaft is rotated by external prime mover, Flynn's bridge and pole wound electro-mechanical device functions as a generator with stator segments having reluctance bridges with an air gap and a reluctance gap control coil. However, Flynn's electromechanical devices only decrease cogging torque without providing any motive force.

Thus, there is still a need for generators that utilize alternate magnetic paths to produce torque through the rotor and produce electricity through the stator in an energy-efficient manner.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides a generator that produces electricity using gaps in the stator and gaps between the stator and rotor poles to alternate between magnetic circuits. One magnetic circuit connects stator magnet pairs and travels through the stator, which includes gaps on either end of a generator coil wrapped around a generator core. An alternate magnetic circuit connects stator and rotor magnets and crosses the gap between the rotor and stator poles as the poles substantially align during operation of the generator.

Stators according to the inventive subject matter include first and second magnetic flux elements having first and second stator poles, respectively. A first magnetic flux donor, e.g., a permanent magnet, donates magnetic flux having a first polarity to the first magnetic flux element. A second magnetic flux donor, e.g., a permanent magnet, donates magnetic flux of having a second polarity, opposite to the first polarity, to the second magnetic flux element. The first magnetic flux element is magnetically coupled to the first end of the generator core across a first gap, and the second magnetic flux element is magnetically coupled to the second end of the generator core across a second gap. Optionally, the stator can include a magnetic flux yoke, magnetically coupled to the first and second ends of the generator core.

In an exemplary embodiment, a rotor comprises a third magnetic flux element having first and second rotor poles. A rotor coil wraps around the third magnetic flux element. The third magnetic flux element also includes a third gap that is at least partially disposed within the rotor coil. Third and fourth magnetic flux donors donate magnetic flux having the second and first polarities, respectively, to the third magnetic flux element on opposite sides of the third gap and rotor coil. The third magnetic flux donor donates magnetic flux having the second polarity to the third magnetic flux element proximate to the first rotor pole, and the fourth magnetic flux donor donates magnetic flux having the first polarity to the third magnetic flux element proximate to the second rotor pole.

As the rotor rotates, alignment of the first rotor pole with the first stator pole creates a fourth gap having a reluctance that is less than the reluctance of the first gap. Because alignment of the first rotor pole with the first stator pole creates a lower reluctance path, magnetic flux from the first magnetic flux donor completes a magnetic circuit with magnetic flux from the third magnetic flux donor across the fourth gap. Passing current through the rotor coil as the first rotor and stator poles align augments the torque by adding magnetic flux to the magnetic flux from the third magnetic flux donor.

The magnetic circuit between the first and third magnetic flux donors breaks as the first rotor pole rotates away from the first stator pole. Magnetic flux from the first magnetic flux donor passes through the first magnetic flux element, across the first gap, through the generator core and generator coil, across the second gap and through the second magnetic flux element to complete a magnetic circuit with the second magnetic flux donor. Thus, as the rotor rotates, magnetic flux through the generator coil varies, generating alternating current.

The stator may further include a magnetic flux yoke that magnetically couples to the first and second ends of the generator core.

In another embodiment, the third and fourth magnetic flux donors comprise a permanent magnet disposed within the third gap. The rotor coil directs magnetic flux of the first polarity toward the first rotor pole and magnetic flux of the second polarity to the second rotor pole.

It should be appreciated that the stator and rotor can each comprise an odd number of pole pairs.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a cross sectional view of a stator.
FIG. 1B is a cross sectional view of a rotor.

DETAILED DESCRIPTION

Figure 1C:
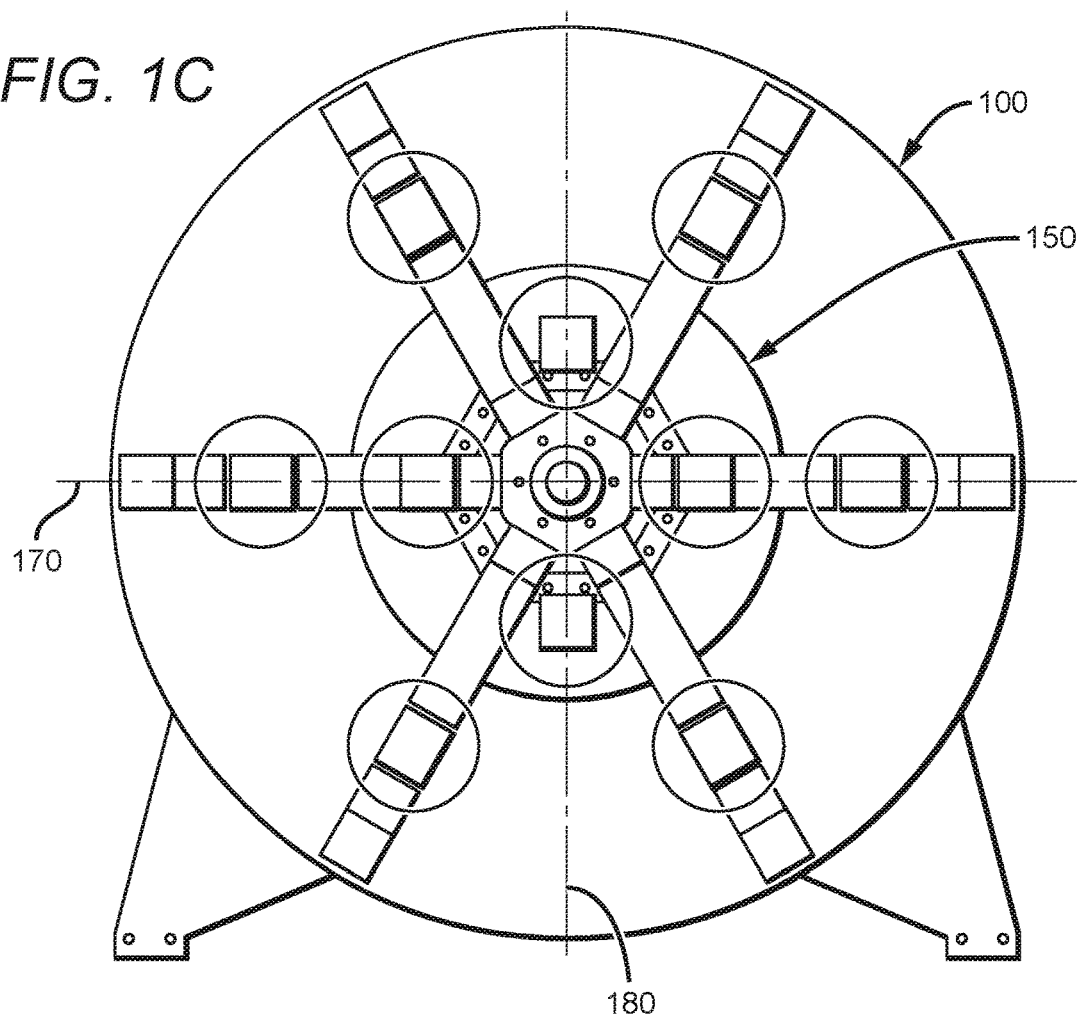
FIG. 1C shows a generator viewed down the rotational axis.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The generators described herein efficiently generate alternating current using alternate magnetic circuits. FIG. 1A shows an exemplary embodiment of stator 100. Stator 100 includes first magnetic flux elements 110 and 120, which have first and second stator poles 111 and 122, respectively. Magnetic flux donors 101 and 102 magnetically couple to magnetic flux elements 110 and 120, respectively. First magnetic flux element 110 magnetically couples to first end 141 of generator core 140 across gap 10, and second magnetic flux element 120 magnetically couples to second end 142 of generator core 140 across gap 20. Generator coil 145 wraps around generator core 140. As shown in FIG. 1A, magnetic flux donor 101 completes a stator magnetic circuit with magnetic flux donor 102. The stator magnetic circuit travels through first magnetic flux element 110, across gap 10, through generator core 140 and generator coil 145, across gap 20, and through magnetic flux element 120. The stator can optionally include magnetic flux yoke 160.

FIG. 1B shows rotor 150. Rotor 150 includes third magnetic flux element 130, which has gap 30 at least partially disposed within rotor coil 135. Third magnetic flux element 130 has first and second rotor poles 131 and 132, respectively. Third magnetic flux donor 103 and fourth magnetic flux donor 104 magnetically couple to third magnetic flux element 130. Magnetic flux from third magnetic flux donor 103 and fourth magnetic flux donor 104 completes a rotor magnetic circuit through third magnetic flux element 130 and across gap 30.

Figure 1D:
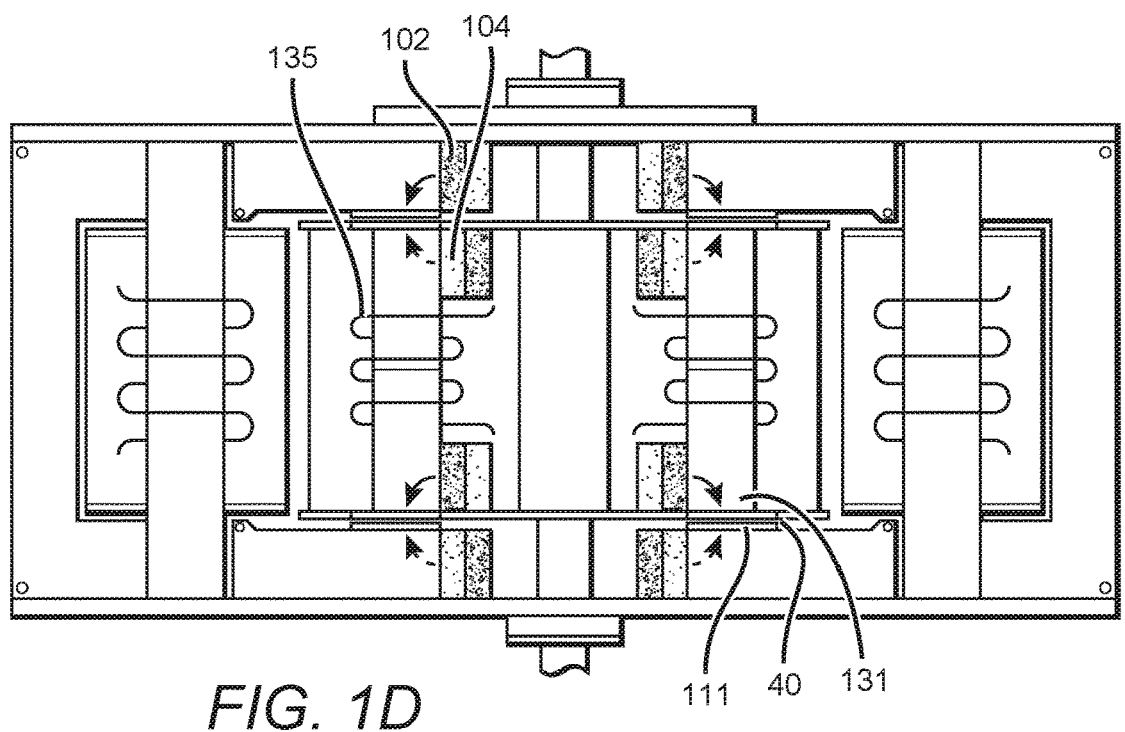
FIG. 1D shows the magnetic circuit formed when the stator and rotor poles are substantially aligned.

FIG. 1C shows a generator viewed down the rotational axis. Stator 100 has six pairs of stator poles. Rotor 150 has four pairs of rotor poles. As rotor 150 turns, first rotor pole 131 substantially aligns with first stator pole 111, as shown along axis 170 of FIG. 1C and in FIG. 1D. As used herein, the term "substantially aligned" means that gap 40 between first rotor pole 131 and first stator pole 111 has a lower reluctance than gaps 10, 20, and 30, so the stator and rotor magnetic circuits are broken. Thus, when first rotor pole 131 and first stator pole 111 are substantially aligned, magnetic flux donors 101 and 103 complete an alternate magnetic circuit that passes through stator pole 111, gap 40, and rotor pole 131. Similarly, magnetic flux donor 102 completes an alternate magnetic circuit with magnetic flux donor 104. The magnetic flux through these circuits can be augmented by applying current through rotor coil 135. It should be appreciated that the on and off timing of current through rotor coil 135 is configured to boost rotor momentum.

As the rotor continues to rotate, the reluctance across gap 40 between the rotor and stator poles increases and the alternate magnetic circuit is broken, and the stator and rotor magnetic circuits are reformed. Along axis 180 (FIG. 1C), the rotor poles are approximately midway between the two nearest stator poles.

Figure 2A:
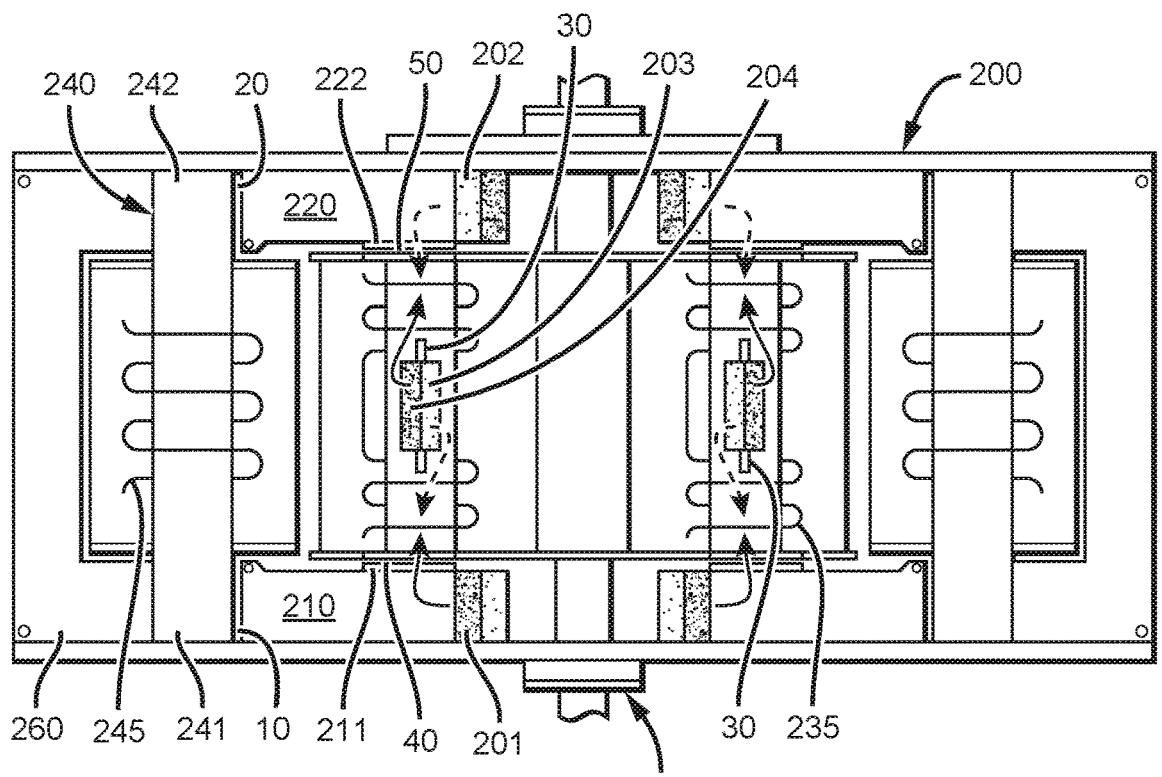
FIG. 2A is a cross sectional view of a generator that has another embodiment of a rotor and shows a first magnetic circuit.

Another exemplary embodiment of a rotor according to the inventive subject matter is illustrated in FIG. 2A. Rotor 250 comprises third magnetic flux element 230 having gap 30. Third magnetic flux donor 203 and fourth magnetic flux donor 204 are disposed within gap 30. Rotor coil 235 wraps around magnetic flux element 230, and gap 30 extends at least partially into rotor coil 235 toward both rotor poles 231 and 232.

Stator 200 includes first magnetic flux elements 210 and 220, which have first and second stator poles 211 and 222, respectively. Magnetic flux donors 201 and 202 magnetically couple to magnetic flux elements 210 and 220, respectively.

FIG. 2A also shows the magnetic circuit formed when rotor poles 231 and 232 are substantially aligned with stator poles 211 and 222, respectively. As first rotor pole 231 rotates toward first stator pole 211, current is applied to rotor coil 235, directing magnetic flux from third magnetic flux donor 203 to complete a magnetic circuit across gap 40 with magnetic flux from first magnetic flux donor 201. The magnetic flux from rotor coil 235 also directs magnetic flux from forth magnetic flux donor 204 to complete a magnetic circuit with second magnetic flux donor 202 across gap 50. Magnetic flux from rotor coil 235 boosts the attractive force between the rotor and stator poles.

Figure 2B:
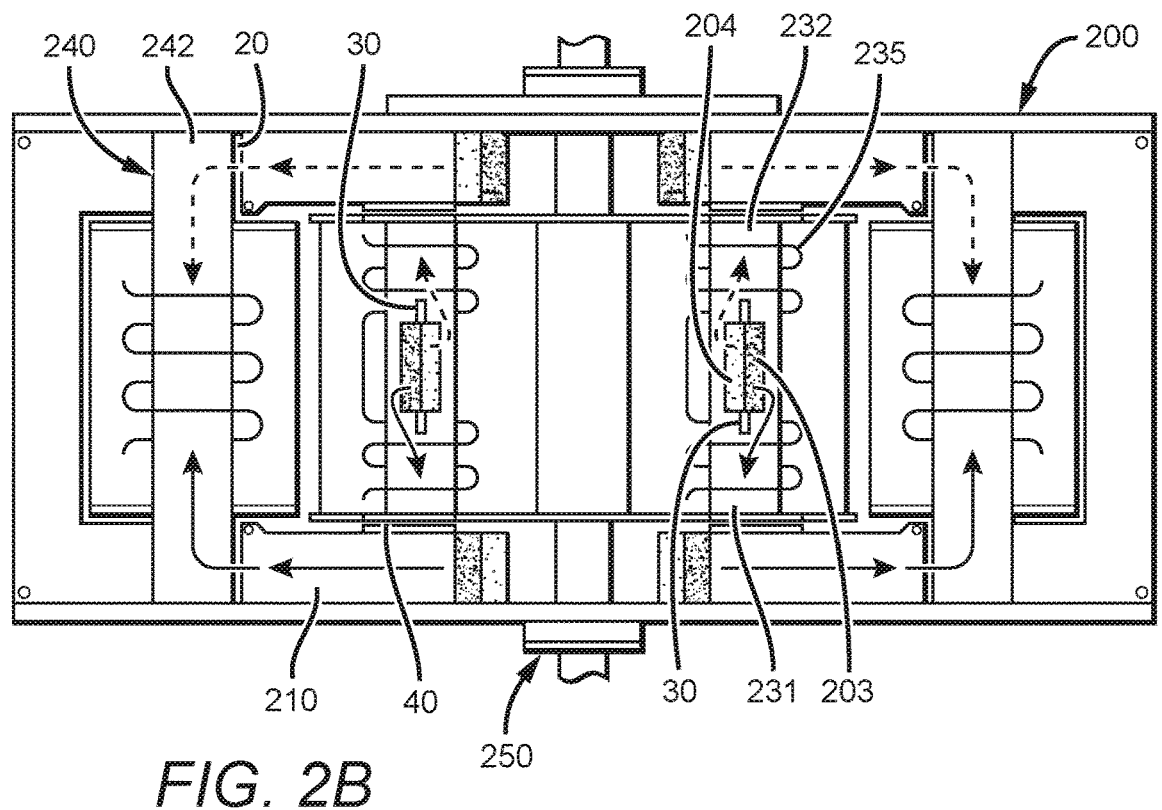
FIG. 2B shows the generator of FIG. 2A and a second magnetic circuit.

As rotor 250 continues rotating, rotor poles 231 and 232 rotate out of substantial alignment with stator poles 211 and 222, respectively, and current through rotor coil 235 is reversed. Reversing the current through rotor coil 235 reverses the direction of the magnetic flux from magnetic flux donors 203 and 204 as shown in FIG. 2B, and the stator poles repel the rotor poles, boosting rotor momentum. First magnetic flux element 210 magnetically couples to first end 241 of generator core 240 across gap 10, and second magnetic flux element 220 magnetically couples to second end 242 of generator core 240 across gap 20. Generator coil 245 wraps around generator core 240. The stator may optionally include magnetic flux yoke 260 that magnetically couples to first and second ends (241 and 242) of the generator core.

One should appreciate that the disclosed techniques provide many advantageous technical effects including efficiently using permanent magnets to generate electricity by providing an alternate magnetic circuit through the rotor.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A generator comprising:
   a stator comprising:
   a generator coil wrapped around a generator core;
   a first magnetic flux element having a first stator pole;
   a second magnetic flux elements having a second stator pole; and
   a rotor comprising:
   a third magnetic flux element having first and second rotor poles;
   a rotor coil wrapped around the third magnetic flux element, wherein an on-and-off timing of current through the rotor coil is configured to boost rotor momentum;
   a third magnetic flux donor that donates magnetic flux having a second polarity to the third magnetic flux element; and
   a fourth magnetic flux donor that donates magnetic flux having a first polarity to the third magnetic flux element, and
   wherein the first stator pole and the first rotor pole are magnetically coupled across a third medium having a third reluctance when the first rotor pole is substantially aligned with the first stator pole, and
   wherein a first reluctance is greater than the third reluctance when the first rotor pole is substantially aligned with the first stator pole.

2. The generator of claim 1, wherein the third magnetic flux donor and the fourth magnetic flux donor are permanent magnets.

3. The generator of claim 1, wherein the third magnetic flux donor comprises a permanent magnet magnetically coupled to the third magnetic flux element on a same side of the rotor coil as a third rotor pole.

4. The generator of claim 3, wherein the fourth magnetic flux donor comprises a permanent magnet magnetically coupled to the third magnetic flux element on a same side of the rotor coil as a fourth rotor pole.

5. The generator of claim 4, further comprising a magnetic flux yoke that completes a magnetic circuit between magnetic flux of the second polarity from the third magnetic flux donor and magnetic flux of the first polarity from the fourth magnetic flux donor.

6. The generator of claim 1, further comprising a magnetic flux yoke, magnetically coupled to a first end and a second end of the generator core.

7. The generator of claim 1, wherein the stator comprises an odd number of pole pairs.

8. The generator of claim 1, wherein the rotor comprises an odd number of pole pairs.

9. The generator of claim 1, wherein the on-and-off timing of the current through the rotor coil produces a magnetic flux which increases an attractive force between the first rotor pole and the first stator pole to boost rotor momentum.

10. The generator of claim 1, wherein the on-and-off timing of the current through the rotor coil reverses a current through the rotor coil which reverses a direction of a first magnetic flux of the first magnetic flux donor which boosts rotor momentum by causing the first stator pole to repel the first rotor pole.

* * * * *

UNITED STATES PATENT AND TRADEMARK OFFICE
CERTIFICATE OF CORRECTION

| | |
|---|---|
| PATENT NO. | : 10,848,017 B2 |
| APPLICATION NO. | : 16/260649 |
| DATED | : November 24, 2020 |
| INVENTOR(S) | : Chad Ashley Vandenberg |

It is certified that error appears in the above-identified patent and that said Letters Patent is hereby corrected as shown below:

On the Title Page

Item (57):
The abstract section should read:
A generator includes a stator that has permanent magnets that complete a magnetic circuit across a series of gaps and through a generator coil. The rotor also includes permanent magnets that complete a magnetic circuit across a gap and through a rotor coil. When the rotor poles align with the stator poles, the stator and rotor magnetic circuits are broken, and new magnetic circuits are completed between the stator and rotor permanent magnets that cross the gap between the stator and rotor poles. A rotor coil can be used to boost the attraction/repulsion between the rotor and stator magnets. Alternating between these magnetic circuits as the prime mover rotates the rotor generates electricity.

Signed and Sealed this
Sixteenth Day of August, 2022

Katherine Kelly Vidal
*Director of the United States Patent and Trademark Office*